US011416952B2

(12) United States Patent
Kasaraneni et al.

(10) Patent No.: US 11,416,952 B2
(45) Date of Patent: Aug. 16, 2022

(54) BILL COMPARISON APPARATUS AND METHOD

(71) Applicant: ORACLE INTERNATIONAL CORPORATION, Redwood Shores, CA (US)

(72) Inventors: Jagadeesh Kasaraneni, San Jose, CA (US); Maksym Stepanenko, Odessa (UA)

(73) Assignee: Oracle International Corporation, Redwood Shores, CA (US)

( * ) Notice: Subject to any disclaimer, the term of this patent is extended or adjusted under 35 U.S.C. 154(b) by 597 days.

(21) Appl. No.: 15/927,180

(22) Filed: Mar. 21, 2018

(65) Prior Publication Data
US 2018/0336648 A1 Nov. 22, 2018

Related U.S. Application Data

(60) Provisional application No. 62/506,713, filed on May 16, 2017.

(51) Int. Cl.
G06Q 50/06 (2012.01)
G06Q 20/10 (2012.01)
(Continued)

(52) U.S. Cl.
CPC ........... *G06Q 50/06* (2013.01); *G06Q 20/102* (2013.01); *G06Q 20/145* (2013.01); *G06Q 30/04* (2013.01)

(58) Field of Classification Search
CPC .... G06Q 50/06; G06Q 20/102; G06Q 20/145; G06Q 30/04
See application file for complete search history.

(56) References Cited

U.S. PATENT DOCUMENTS

| 10,614,532 B1 * | 4/2020 | Han | G06Q 50/06 |
| 2010/0064001 A1 * | 3/2010 | Daily | G06Q 30/04 |
| | | | 709/203 |

(Continued)

FOREIGN PATENT DOCUMENTS

| JP | 2002-157305 A | 5/2002 |
| JP | 2010-097589 A | 4/2010 |
| JP | 2015-099492 A | 5/2015 |

OTHER PUBLICATIONS

Fischer, C. "Feedback on household electricity consumption: a tool for saving energy?". Energy Efficiency 1, 79-104 (2008). https://doi.org/10.1007/s12053-008-9009-7 (Year: 2008).*

(Continued)

*Primary Examiner* — George Chen
*Assistant Examiner* — Wayne S. Murray
(74) *Attorney, Agent, or Firm* — Kraguljac Law Group, LLC

(57) ABSTRACT

Systems, methods, and other embodiments associated with controlling a comparison of energy costs for a current and a previous billing cycle are described. In one embodiment, current billing data and previous billing data are received. A variable having a different value for the current billing than for the previous billing data is identified. A value of the variable in the current billing data is modified with a value of the variable in the previous billing data to determine a hypothetical energy cost for the current billing cycle based on the value of the variable in the previous billing data. A cost difference between the total cost of energy for the current billing cycle and the hypothetical energy cost is determined, and a personalized data structure for an energy user is generated. The data structure includes an individual contribution of the modified value of the variable toward the cost difference.

20 Claims, 9 Drawing Sheets

(51) Int. Cl.
*G06Q 20/14* (2012.01)
*G06Q 30/04* (2012.01)

(56) References Cited

U.S. PATENT DOCUMENTS

| | | | |
|---|---|---|---|
| 2014/0058572 A1* | 2/2014 | Stein | H02J 13/00004 700/291 |
| 2016/0070285 A1* | 3/2016 | Gupta | G05B 15/02 700/295 |
| 2016/0110736 A1 | 4/2016 | Sloss et al. | |

OTHER PUBLICATIONS

Patent Cooperation Treaty (PCT) International Search Report and Written Opinion in co-pending PCT International Appl. No. PCT/US2018/032654 (International Filing Date of May 15, 2018) dated Aug. 28, 2018 (11 pages).

Japanese Patent Office, Notice of Reasons for Refusal issued in Japanese Patent Application No. 2019-563286 dated Jan. 31, 2022 (2pgs).

* cited by examiner

BILL COMPARISON APPARATUS AND METHOD

CROSS REFERENCE TO RELATED APPLICATIONS

This disclosure claims the benefit of U.S. Provisional Patent Application Ser. No. "62/506,713" filed May 16, 2017, titled "Bill Comparison Apparatus and Method" inventors: Jagadeesh KASARANENI, et al., and assigned to the present assignee.

BACKGROUND

The monetary amount charged for energy supplied by utilities, such as power providers, varies based on a variety of factors. For example, the quantity of energy consumed may change from one billing period to the next. These fluctuations may be caused by a change in the consumption pattern of an energy consumer, a change in the number of days in each billing period, and other such factors that directly contribute to the total quantity of energy consumed during each billing period. But since each of these factors results in a change in the total quantity of energy consumed during a billing period, the dollar amount that can be attributed to each factor can be readily itemized in a bill summary. A change in the monetary amount charged for energy during different billing periods, however, can also be attributed to other factors that do not affect the quantity of energy consumed. Attempts to itemize the factors contributing to a change in the monetary amount billed between billing periods based solely on the quantity of energy consumed, without consideration of these other factors, creates a dataset that does not accurately identify the reasons behind the change in the monetary amount billed. Thus, conventional systems that do not take into consideration of these other factors are unable to control the generation of data structures that accurately attribute changes in a monetary amount paid for energy during different billing periods. Conventional systems are also unable to control the distribution of individualized information to a network of energy consumers, to accurately identify reasons unrelated to the quantity of energy consumed by users that contributed to a change in the monetary amount owed for energy between billing periods.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale. In the drawings.

DETAILED DESCRIPTION

Figure 1:
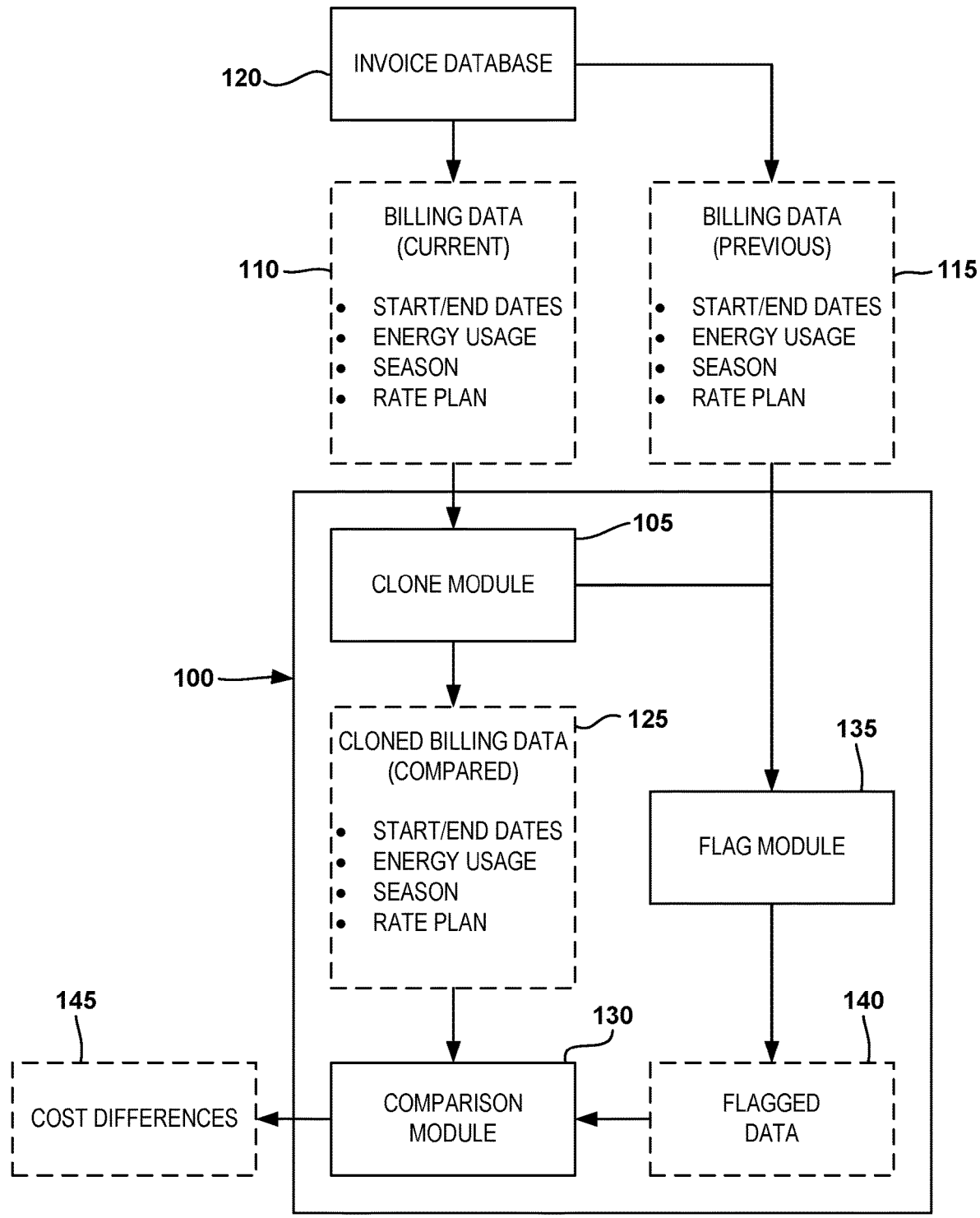
FIG. 1 provides an illustrative embodiment of a system for allocating changes in monetary amounts billed during different billing cycles to a plurality factors.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

It will be appreciated that the systems and methods presented by this disclosure are novel, as are applications thereof and many of the components, systems, methods and algorithms employed and included therein. It should be appreciated that aspects of the presently described inventive body of work can be implemented in numerous ways, including as processes, apparatuses, systems, devices, methods, computer readable media, computational algorithms, embedded or distributed software and/or as a combination thereof.

Aspects of the present technology address at least a portion of the foregoing problems associated with attributing a change in the total energy cost between a current billing cycle and a previous billing cycle to specific factors related to fees charged for energy. The specific factors related to fees charged for energy may be unrelated to the quantity of energy consumed by individual energy users during a billing cycle. According to some embodiments, whether the cost of energy, the rate plan under which energy is sold to an energy user, or both the cost of energy and the rate plan is different for the billing cycles is determined. The cost of energy can change as a result of a seasonal change such as crossing a seasonal boundary during one of the billing cycles or between the billing cycles. Thus, one or more different seasonal rates may be in effect during the billing cycles. The cost of energy can also change as a result of a non-seasonal change such as a rate increase and/or decrease unilaterally enacted by the utility. Energy costs can also change as a result of a combination of a seasonal change and a non-seasonal change. If the cost of energy during the billing cycles being compared is different, the hypothetical total cost of the energy used during the current billing cycle, if used during the previous billing cycle, is determined. This can be accomplished by applying the usage pattern of the current billing cycle and the rate(s) in effect during the current billing cycle to the dates of the previous billing cycle, without changing the rate plan(s). The difference between the total energy cost of the current billing cycle and the hypothetical total energy cost of the energy, if used during the previous billing cycle, provides an indication of the portion of the change in total cost attributable solely to changes in the price of energy.

Similarly, the energy user may elect to change rate plans during one of the compared billing cycles or at a time between the compared billing cycles. If this occurs, the hypothetical cost of the energy usage pattern of the current billing cycle, for the dates of the current billing cycle, is determined based on the rate plan(s) in effect for the previous billing cycle. The difference between (i) the total energy cost of the current billing cycle and (ii) the hypothetical cost of the energy usage pattern of the current billing cycle determined based on the rate plan(s) in effect for the previous billing cycle is determined. This difference provides an indication of the portion of the change in total energy cost between the billing cycles that is attributable solely to the change in the rate plan. Accordingly, embodiments of the present system and method can attribute changes in amounts owed for energy during different billing cycles to factors that may not otherwise be apparent based on a bill broken down according to factors relating only to the quantity of energy used and a billing rate for each billing period. These factors can apply to a portion, but less than one full billing cycle, or can change at a time between the billing cycles. Regardless of when one or more of these factors change, it/they can affect the monetary amount to be paid for energy differently for each of the billing cycles to be compared.

To overcome at least some of the shortcomings associated with conventional systems, the portions of the change in total energy costs attributed to (i) changes in the price of energy, and (ii) changes in the rate plan of the billing cycles that are compared is itemized in a report transmitted to an energy user. The added degree of specificity with regard to the total cost of energy in utility bills is expected to reduce the number of misunderstandings on the part of energy users and complaints submitted to utilities. Such improvements are achieved by identifying, in an itemized manner as a line item in an energy cost report, one or more factors that influenced an energy cost change between billing cycles that may be unrelated to the quantity of energy consumed by the energy user, or otherwise be out of the control of the energy user. Such factors may be invisible to energy users in a breakdown of energy costs based solely on the quantity of energy consumed during billing cycles. Further, the itemization of the amounts attributed to changes in the price of energy or changes in the rate plan improves the efficiency of communications to energy users. This enables energy users to readily recognize factors under their control that can be improved to limit the amount owed during future billing cycles. Thus, the itemized factors that contributed toward a change in the monetary amount paid for energy can cause changes in the operation of devices within a dwelling. For example, the operation of systems or appliances (e.g., heating, ventilation, air conditioning ("HVAC") systems, cooking appliances, and other energy hungry devices) can be controlled based on the accurate itemization of factors transmitted to energy users. The energy users are thus able to accurately predict energy costs associated with various billing cycles based on their energy consumption behavior.

With reference to the drawings, FIG. 1 depicts an illustrative embodiment of a system 100 for itemizing factors contributing to a change in the total cost of energy billed to an energy user during different billing cycles. For the sake of brevity, the present system 100 will be described in detail for allocating portions of a total energy cost increase in an electric bill for one monthly billing cycle relative to the immediately-preceding monthly billing cycle to different factors. These factors include, without limitation, changes in an electric rate charged by a utility for energy, including seasonal or non-seasonal changes; or the adoption of a different rate plan by an energy user. However, it is understood that the present system 100 may be used to allocate a change in the cost of any type of energy or other utility-supplied product or service, including without limitation electricity, natural gas, or water. This allocation can also be performed for cycles of any desired period of time including, without limitation: monthly, quarterly, annual, seasonal, or any other billing period.

Figure 9:
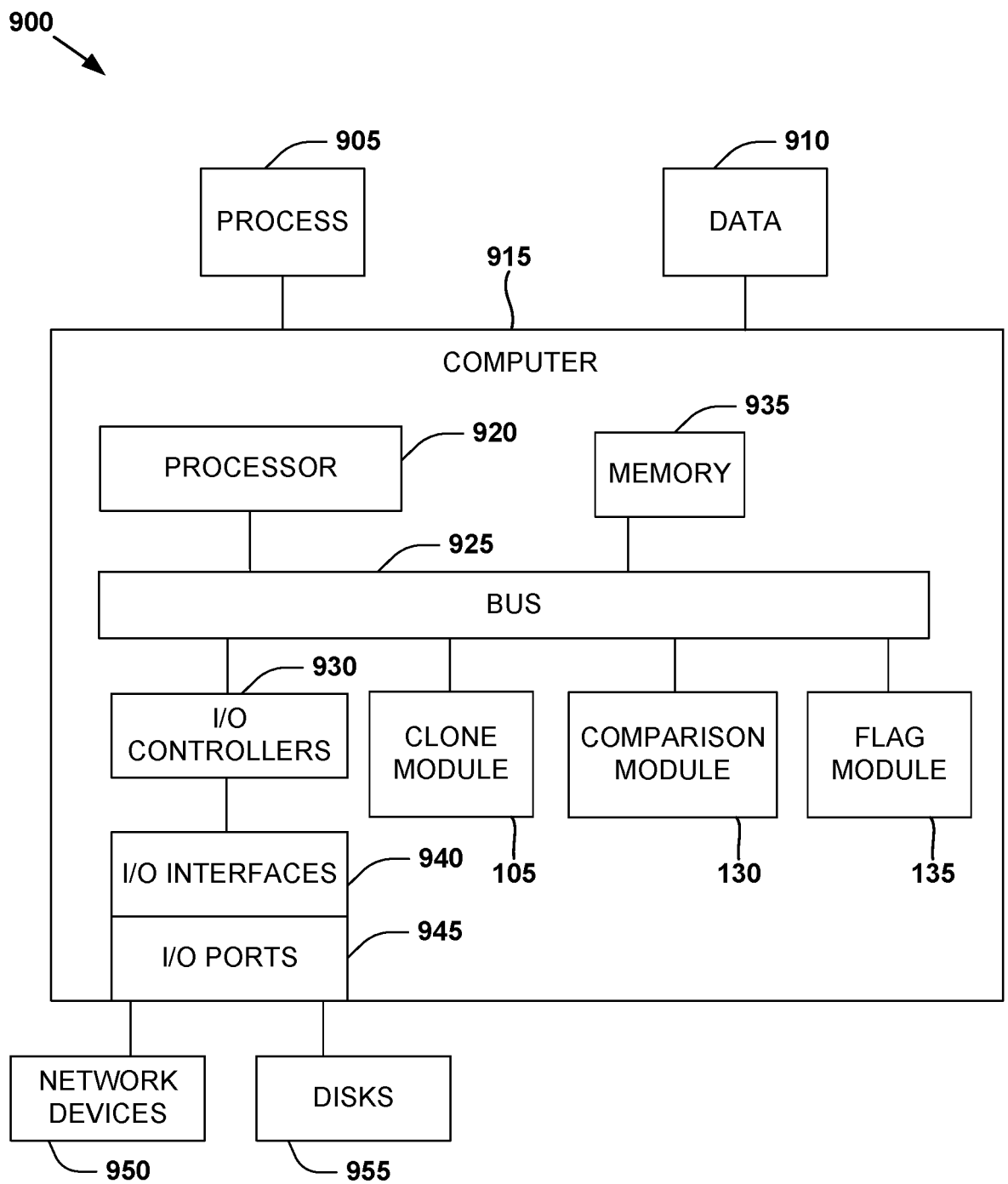
FIG. 9 is a block diagram graphically depicting a computer that can be configured to generate an itemized breakdown of factors contributing to a change in an total energy cost between different billing cycles.

As illustrated, the system 100 includes a clone module 105, which can be implemented as part of a computer such as the computing device 900 of FIG. 9. The clone module 105 is configured to receive current billing data 110 from an invoice database 120 that is accessible by the computing device 900, optionally via a computer network, and generate a clone 125 of the current billing data 110 for the current month. The clone 125 is a data structure including information that matches the current billing data 110. Alternate embodiments of the clone module 105 can be configured to generate a clone of the previous billing data 115 for the previous month. For illustrative purposes, however, the clone module 105 will be described as creating the clone 125 of the current billing data 110 for the current monthly invoice. Embodiments of the clone 125 can be modified to include billing data from one billing cycle (e.g., a current billing cycle), re-analyzed under conditions that were in effect for another billing cycle (e.g., a previous billing cycle). Thus, the clone 125 of one or more embodiments can be generated to facilitate a consistent, apples-to-apples comparison of the billing data for two or more different billing cycles.

The clone 125 will include the current billing data 110 obtained from the invoice database 120. This data includes, but is not limited to: a start date and an end date of the current monthly billing cycle, total electricity usage for the current monthly billing cycle, each season included in the current monthly billing cycle, and each rate plan in effect during the current monthly billing cycle. The total electricity usage for the current monthly billing cycle can be obtained to be stored in the database 120 as a result of readings by an electric meter or other suitable sensor installed at a consumption location such as a residential dwelling (e.g., the energy users' homes) or another metering location. The electric meter or other sensor can quantify the energy consumed at the consumption location, and the data from such an electric meter or other sensor can optionally be received over a communication network (e.g., the Internet), or by manual intervention. The previous billing data 115 will include the same information as that included in the current billing data 110, but the data included in the previous billing data 115 will be specific to the previous monthly billing cycle.

The expressions included herein include input parameters that include the term "cur" as shorthand to identify data included in the current billing data 110 for the current monthly billing cycle. Each billing cycle is defined by the date on which the monthly billing cycle begins ("startDate") and the date on which the monthly billing cycle ends. Thus, "cur.startDate" is the variable representing the date on which the current monthly billing cycle begins and "cur.endDate" is the variable representing the date on which the current monthly billing cycle ends. Other input parameters are defined for the current monthly billing cycle as:

cur.usage=total electric usage during the current monthly billing cycle
cur.season=season(s) in effect during the current monthly billing cycle
cur.ratePlan=rate plan(s) in effect during the current monthly billing cycle Similarly, the shorthand "cmp" is used herein to denote the "compared bill period," which is the previous monthly billing cycle in the illustrative embodiments described herein. Input parameters that correspond to the previous monthly billing cycle are identified through the use of "cmp" as follows:

cmp.startDate=date on which the previous monthly billing cycle begins
cmp.endDate=date on which the previous monthly billing cycle ends
cmp.usage=total electric usage during the previous monthly billing cycle
cmp.season=season(s) in effect during the previous monthly billing cycle
cmp.ratePlan=rate plan(s) in effect during the previous monthly billing cycle A comparison module 130 will overwrite at least a portion of the current billing data 110 included in the clone 125 with hypothetical values as described below so the clone 125 with the hypothetical values can be compared to previous billing data 115. For example, if the current billing data 110 is to be used to calculate what the total energy cost would have been for the previous monthly billing cycle, the comparison module 130 can overwrite or otherwise replace cur.startDate and cur.endDate with cmp.startDate and cmp.endDate, respectively. Editing the current billing data 110 in the clone 125 creates a useful reference document for comparison purposes, and preserves the integrity of the current billing data 110 in the invoice database 120. As a result, the data retrieved from the invoice database 120 can remain unchanged by the processes described herein.

A flag module 135 is configured to receive the current billing data 110 and the previous billing data 115, and compute flags identifying differences between the current billing data 110 and the previous billing data 115. The differences flagged by the flag module can encompass any differences between the current and previous billing data 110, 115 that contribute to a change in the total energy cost from the previous month to the current month. For example, the flag module 135 can utilize logical operators to compare the value associated with certain categories of information included in the current billing data 110 and the value of the corresponding categories in the previous billing data 115. A flag bit is set in a data structure referred to herein as flagged data 140 that is transmitted to the comparison module 130 to identify any categories where the current billing data 110 does not match the previous billing data 115. The flag bits identify the factors relating to the cost of energy or the rate plan adopted by the user to which portions of the cost increase between billing cycles are to be allocated.

Based on the flagged data 140, the comparison module 130 can selectively edit the data in the clone 125 to change a single variable for each comparison of the clone 125, as edited, to the current or previous billing data 110, 115 to determine the contribution of the changed variable to the change in total energy cost. Thus, if the flag module 135 indicates that the rate plan and the season in the current billing data 110 are different than the rate plan and the season in the previous billing data 115, the comparison module 130 can change the rate plan in the clone 125 while holding the season constant. The comparison module can then compare the total cost of energy determined based on the edited clone 125 to the total cost of energy based on the current billing data 110 to determine the portion of the change in the total energy cost from the previous month to the current month that is attributable to the change in the rate plan. Similarly, the comparison module 130 can change the season of the current monthly cycle in the clone 125 while holding the rate plan constant. The total energy cost based on this edited clone 125 can be compared to the total energy cost based on the current billing data 110 to determine the portion of the change in the total energy cost from the previous month to the current month that is attributable to the change in the season.

Figure 8:
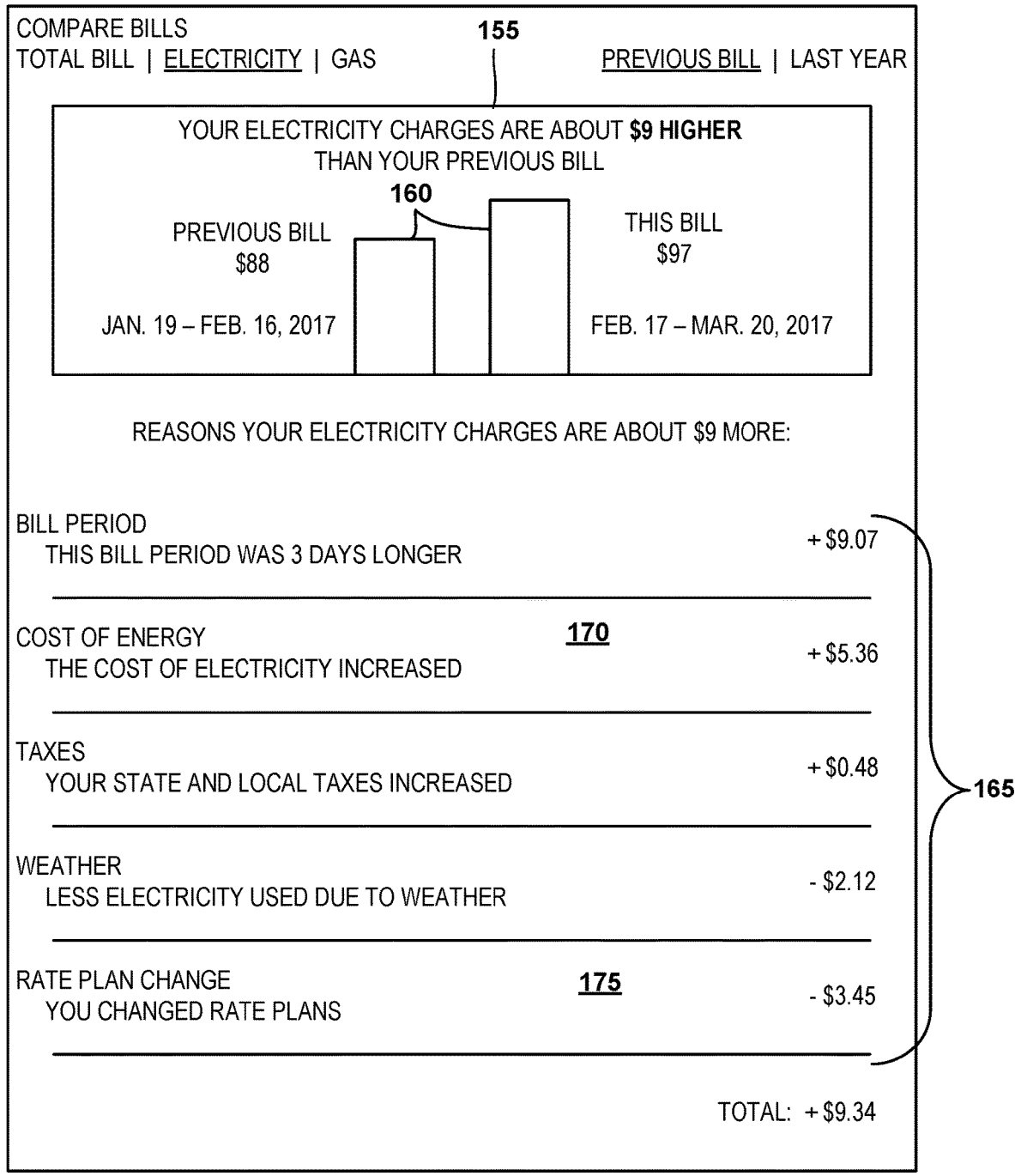
FIG. 8 shows an illustrative embodiment of an invoice with an itemized breakdown of each factor's individual contribution to a change in the total energy cost between different billing cycles, the invoice having been transmitted over a network and displayed to an energy user.

The comparison module 130 can create a data structure 145, labeled "COST DIFFERENCES" in FIG. 1, with an itemized breakdown of the extent to which a change in each factor between billing cycles individually affects a change in the total energy cost between those billing cycles. The data structure 145 can be structured and individualized for the energy user, for transmission over a computer network to be received and displayed by a recipient computer. An illustrative embodiment of the data structure 145 also includes invoice content to be delivered to the recipient computer as part of an invoice 150 to the energy user, as shown in FIG. 8.

As shown, the invoice 150 includes a summary 155 with a graphical representation 160 of the change in total energy cost from the previous monthly billing cycle to the current monthly billing cycle. An itemized breakdown 165 of the individual factors that contribute to this change in total energy cost is also included as part of the invoice 150. A cost entry 170 indicates that a seasonal or non-seasonal change in the electric rate occurred during the previous monthly billing cycle, the current monthly billing cycle, or both. Determined as described below, the cost entry 170 indicates that a net increase of $5.36 of the net $9.34 increase in the total energy cost from the previous monthly billing cycle can be attributed to the seasonal or non-seasonal change in the electric rate set by the utility. Similarly, a rate plan entry 175 indicates that a net reduction of $3.45 can be attributed to a change in the rate plan selected by the energy user during the previous monthly billing cycle or the current monthly billing cycle.

Figure 2:
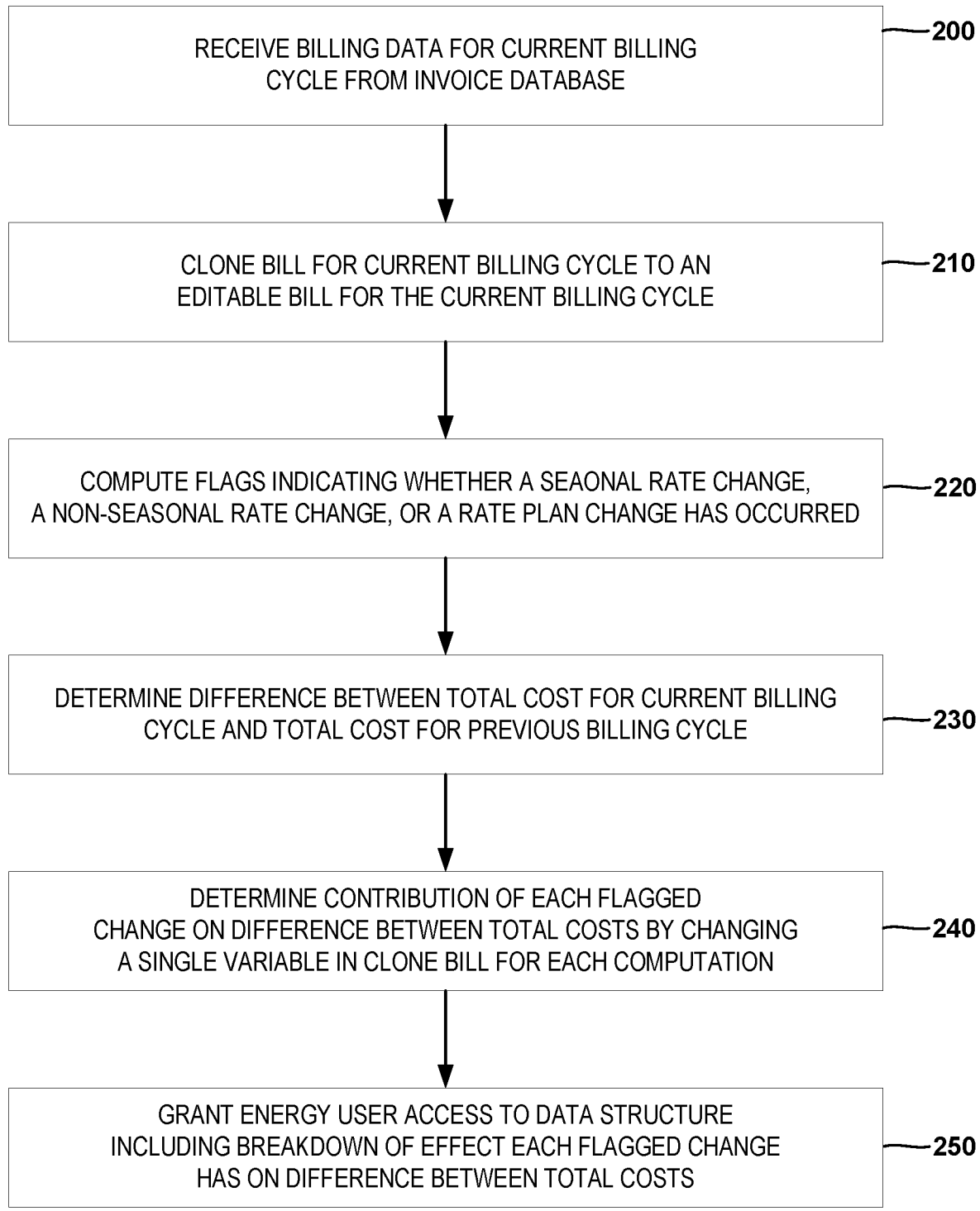
FIG. 2 is a flow diagram illustrating an embodiment of a process for allocating changes in monetary amounts billed during different billing cycles to a plurality factors.

An embodiment of a computer-implemented method of determining whether a change in the electric rate or a change of a rate plan contributed to a change in the total energy cost between billing cycles is illustrated in the flow diagram of FIG. 2. At 200, the cloning module receives the current billing data 110 from the invoice database 120, and the previous billing data 115 is received by the flag module 135. The current billing data 110 is also received by the flag module 135, whether from the invoice database 120 or relayed by the clone module 105 or other intermediate device.

The cloning module 105 creates the editable clone 125 of the current billing data 110 at 210. The editable clone 125 can be a temporary record stored in a non-transitory computer-readable medium 935 (FIG. 9) provided to the computing device 900. The value of one input parameter can be changed in the clone 125 by the comparison module 130 for performing an apples-to-apples comparison of the energy cost attributable to that changed input parameter with the previous billing data 115. More than one clone 125 can be created by the clone module 105 at 210 and stored in the computer-readable medium 935. For example, a separate clone 125 can be created for each input parameter that changed between the billing cycles, as identified by the flag module 135. A separate, single input parameter can be changed in each clone 125, keeping the remaining variables constant.

At 220 of FIG. 2, the flag module 135 computes flags to identify differences between the current billing data 110 and the previous billing data 115. Specifically, the flag module 135 sets flags to indicate that the electric rates for the current and previous billing cycles are different, or that the rate plans adopted by the energy user in the current and previous billing cycles are different. A change in the electric rates can result from a seasonal change in rates by the utility according to a seasonal schedule. A seasonal change occurs when a seasonal boundary is crossed during one of the current or previous billing cycles. A non-seasonal rate change may influence the total energy cost in addition to, or instead of the seasonal change. A non-seasonal rate change occurs when the utility elects to raise or lower rates, in its discretion, optionally independent of any seasons. In contrast to the then-current rates, which may not be constant for any prescribed length of time, rate plans are programs offering energy at an agreed-upon fee schedule to the energy for a defined length of time. To determine whether a change of season, a change of an electric rate, or a change of a rate plan has occurred, expressions [1]-[3], respectively, can be utilized:

boolean seasonChanged=(cur.season!=cmp.season)     [1]

boolean ratesChanged=
(cur.earliestRatePlanComponentPriceStartDate>=cmp.endDate)     [2]

boolean ratePlanChanged=
(cur.ratePlan!=cmp.ratePlan)     [3]

wherein cur.earliestRatePlanComponentPriceStartDate in expression [2] is the earliest date of the current monthly billing cycle on which the electric rate(s) for that billing cycle were in effect. A true result for the above expressions indicates that the respective factors are different for the current and previous monthly billing cycles. The contribution of each changed factor to a change in the total energy cost for the current and previous monthly billing cycles is to be determined and included in the data structure 145.

Figure 4A:
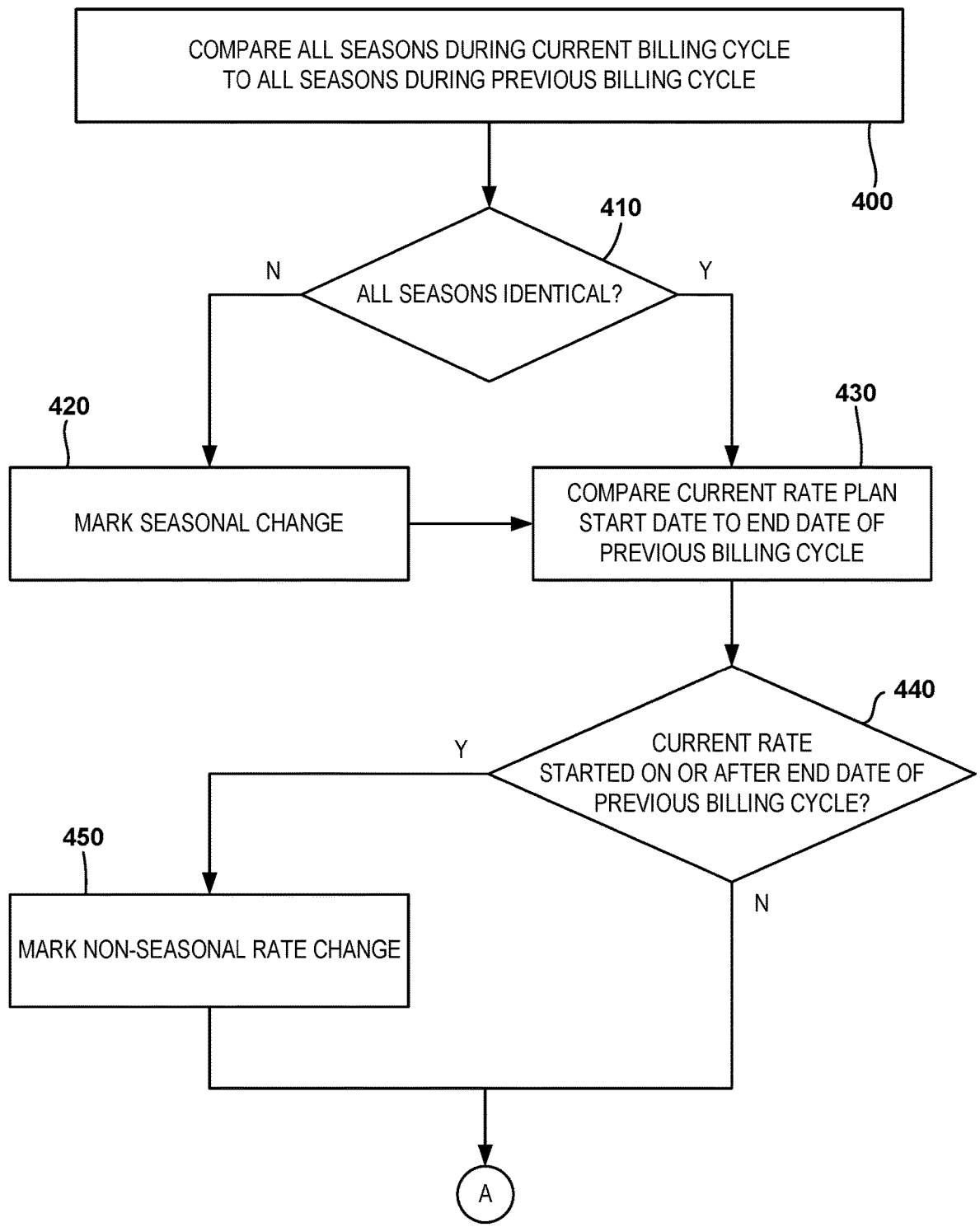
FIG. 4A is a flow diagram for determining whether a seasonal rate change or a non-seasonal rate change occurred during a current billing cycle relative to a previous billing cycle.
Figure 4B:
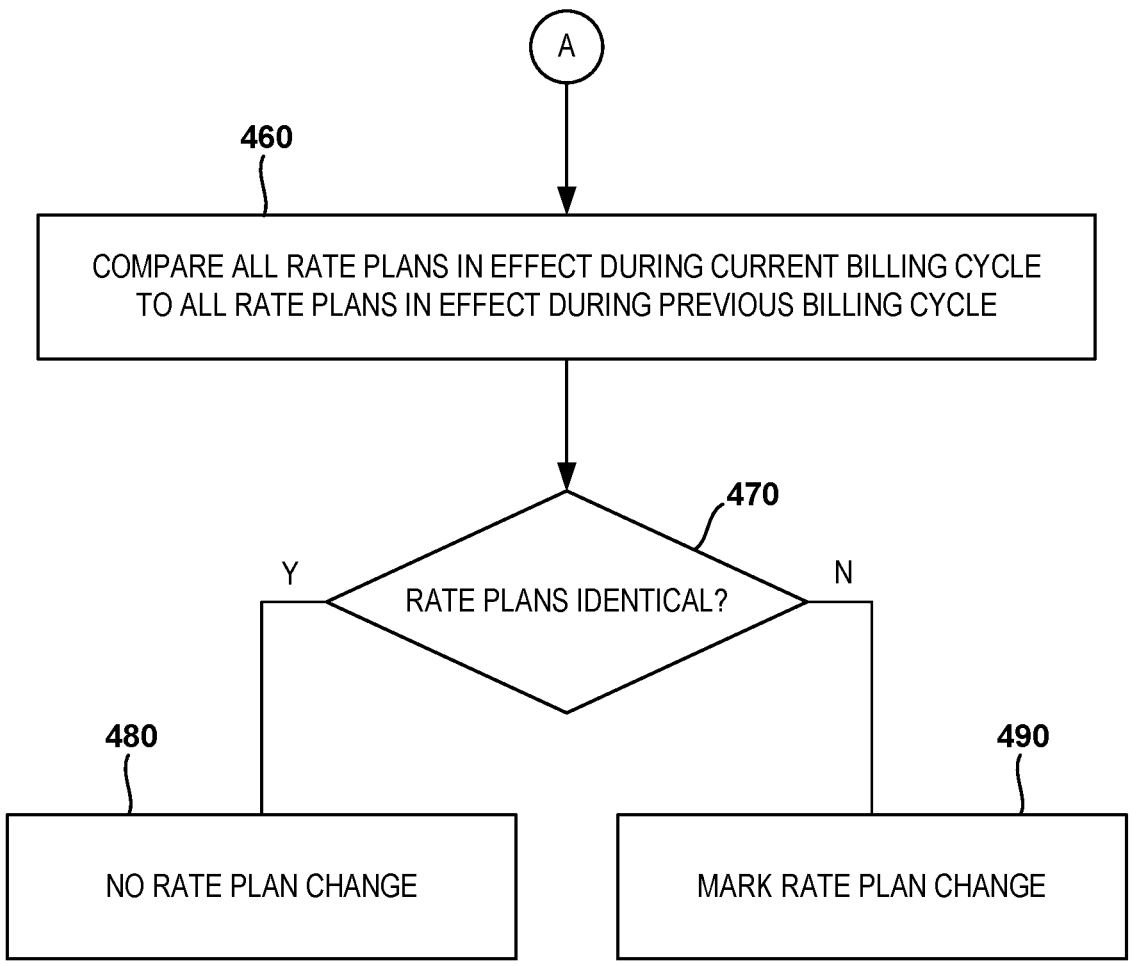
FIG. 4B is a flow diagram for determining whether the rate plan(s) of a current billing cycle is/are different than the rate plan(s) of a previous billing cycle.

More specifically, a method of answering the above Boolean expressions is illustrated by the flow diagram of FIGS. 4A and 4B. Since a billing cycle can span more than a single season, expression [1] requires all seasons included in the current billing data 110 to be compared to all seasons included in the previous billing data 115 at 400 of FIG. 4A. If it is determined, at 410, that all seasons in each billing cycle are identical, or if a null value represents the season in the current or previous billing data 110, 115, then it is concluded that there are no seasonal differences between the two billing cycles that would contribute to a change in the total energy cost. If, however, a single different season is included in the current or previous billing data 110, 115, the seasonal change flag is marked at 420. Table 1, below, illustrates the uniformity of the seasons (or null value) required to conclude that the seasonal rates for the billing cycles are not different. Marking the seasonal change flag at 420 indicates that a seasonal rate change has contributed to the total change in energy cost between billing cycles. As a result of setting the seasonal change flag at 420, the portion of the total change in energy cost between billing cycles attributable to a change in the rates charged by the utility is to be determined. If, at 410, it is determined that all seasons in each billing cycle are identical, then the seasonal change flag is not set.

TABLE 1

Computing Seasonal Rate Change Flags

| cur.seasons | cmp.seasons | seasonal flag |
|---|---|---|
| WINTER | SUMMER | TRUE |
| SUMMER, WINTER | WINTER | TRUE |
| SUMMER, WINTER | SUMMER, SPRING | TRUE |
| SUMMER | NULL | FALSE |
| SUMMER, WINTER | SUMMER, WINTER | FALSE |
| WINTER | WINTER | FALSE |
| NULL | NULL | FALSE |

At 430, the start date of the rate included in the current billing data 110 as being in effect during the current monthly billing cycle is compared to the end date of the previous monthly billing cycle using expression [2] above. If it is determined, at 440, that the start date of the rate included in the current billing data 110 is on, or after the end date of the previous monthly billing cycle, then it is concluded that the electric billing rate of the current monthly billing cycle is different than the electric billing rate in effect during the previous monthly billing cycle. A non-seasonal change flag is also set by the flag module 135 at 450. Table 2, below, illustrates the comparison of the start date of the rate included in the current billing data 110 to the end date of the previous monthly billing cycle. If the start date of the rate included in the current billing data 110 is earlier in time than the end date of the previous monthly billing cycle, the non-seasonal rate change flag is not set. The price of energy established by the utility is determined to be different in the current and previous monthly billing cycles if the seasonal change flag or the non-seasonal change flag is set.

TABLE 2

Computing Non-Seasonal Rate Change Flags

| cur.earliestRateStartDate | cmp.endDate | non_seasonal flag |
|---|---|---|
| 1 Feb 2016 | 31 Jan 2016 | TRUE |
| 31 Jan 2016 | 31 Jan 2016 | TRUE |
| 30 Jan 2016 | 31 Jan 2016 | FALSE |
| 1 Jan 2016 | 31 Jan 2016 | FALSE |

The process of determining whether the rate plan elected by the energy user is different for the billing cycles involves comparing all rate plans in effect during the current monthly billing cycle to all rate plans in effect during the previous monthly billing cycle at 460 of FIG. 4B. Similar to the seasonal comparison, a billing cycle can include more than a single rate plan. Expression [3], above, requires all rate plans included in the current billing data 110 to be compared to all rate plans included in the previous billing data 115 at 460 of FIG. 4B. If it is determined, at 470, that all rate plans in each billing cycle are identical, then it is concluded that there are no rate plan differences between the two billing cycles that would have contributed to a change in the total energy cost between those two billing cycles at 480. If, however, it is determined at 470 that a single difference exists between the rate plan(s) in the current billing data 110 and the previous billing data 115, or a null value represents the rate plan in the current billing data 110 and the previous billing data 115, the rate plan change flag is marked at 490. Table 3, below, illustrates the uniformity of the rate plans required to conclude that a change in the rate plane elected by the energy user did not contribute to a change in the total energy cost between billing cycles. Marking the rate plan change flag at 490 indicates that a change in rate plans has contributed to the total change in energy cost between the billing cycles. As a result of setting the rate plan change flag at 490, the portion of the total change in energy cost between billing cycles attributable to a change in the rate plans by the user is to be determined.

TABLE 3

Computing Rate Plan Change Flags

| cur.ratePlans | cmp.ratePlans | rate plan change flag |
|---|---|---|
| [HE1] | [HE6] | TRUE |
| [HE1, HE6] | [HE6] | TRUE |
| [HE1] | [ ] | TRUE |
| [HE1] | [HE1] | FALSE |
| [HE1] | [HE1_CARE] | TRUE |
| [HE1_CARE] | [HE1] | TRUE |
| [HE7] | [HE1_MEDICAL] | TRUE |
| [HE1_MEDICAL] | [HE7] | TRUE |
| [HE6] | [HE6_SMART] | TRUE |
| [HE6_SMART] | [HE6] | TRUE |
| [ ] | [ ] | FALSE |

The contribution of a change in the electric rates by the utility or the change in the rate plan by the user, as flagged by the flag module 135, toward a change in the total energy cost for the billing cycles is to be determined. With continued reference to FIG. 2, the total cost of energy for the current billing cycle and the total cost of energy for the previous billing cycle can be determined, at 230, based on the current and previous billing data 110, 115, respectively. Using the total cost of energy for each billing cycle and by changing one of the flagged factors at a time, the contribution of each flagged factor can be determined at 240. The total energy cost for the current month billing cycle, optionally compared with the total energy cost for the previous month billing cycle, can be included in the data structure 145 along with the contribution of each flagged factor toward the difference between total energy costs of the billing cycles. Access to the data structure 145 can be controlled by the computing device 900 at 250, optionally implemented as a server or other terminal that is accessible over a wide area network such as the Internet. For example, the data structure 145 can be generated to indicate a detailed, itemized breakdown of the factors that contributed to a change in energy costs between billing cycles to cause a change in the operation of energy-consuming devices associated with a building to achieve an energy cost within a budget. The data structure 145 can be transmitted to a recipient computer terminal over a communication network associated with a specific energy user affiliated with that building. As another example, the data structure 145 can be rendered accessible as a result of selection of a link transmitted to a computing device operated by the energy user. In response to selection of the link, access to the data structure 145 can be granted over the communication network. The link can optionally lead to a network-accessible user account of the energy user, who is responsible for remitting payment for the total energy cost, or affiliated with the responsible party. The itemized breakdown of the individual contributions to the price change can be rendered accessible by the energy user as part of an invoice for the current monthly billing cycle, and access to the user account can be restricted by an encryption system, requiring login credentials to access the information associated with the user account. As a result of conveying the itemized breakdown of factors that contribute to energy cost fluctuations, thermostats can be controlled, HVAC usage can be regulated, and energy users can accurately predict energy costs based on their energy consumption behavior.

Figure 3:
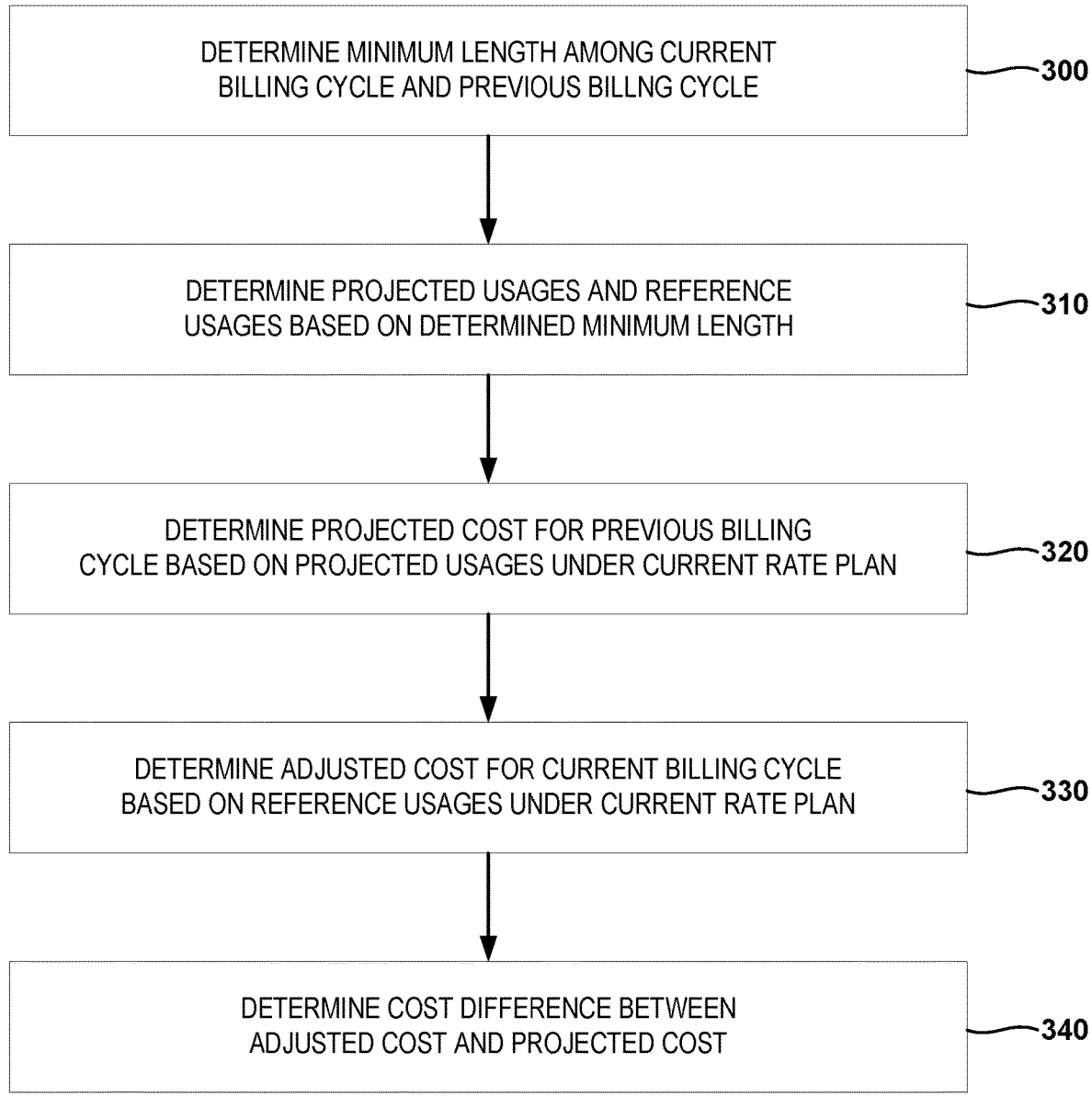
FIG. 3 is a flow diagram for modeling current energy usage in a current billing cycle into a previous billing cycle.

To determine the portion of the change in total energy cost attributable to a single variable, such as each of the flagged factors for example, a portion of the current billing data 110 such as the current usage, for example, is adapted in the clone 125 to be modeled into the previous billing cycle. Different monthly billing cycles may have different numbers of days. To facilitate an apples-to-apples comparison of the current billing data 110 to the previous billing data 115 for determining the contributions to changes in the total energy cost attributable solely to rate changes and rate plan changes, the current billing data 110 is changed in the clone 125. The changes involve adjusting terms such as the energy usage, for example, to account for differences in the number of days in each billing cycle according to the method illustrated in the flow diagram of FIG. 3.

To model energy usage of the current monthly billing cycle into the previous monthly billing cycle, the minimum number of days in the two billing cycles is determined at step 300. As indicated by the first and third entries of Table 4, below, if the number of days in the current monthly billing cycle is less than or equal to the number of days in the previous month billing cycle, no adjustment of the usage for the current monthly billing cycle is required at 310 of FIG. 3. The excess days of usage during the previous monthly billing cycle that exceed the total days of usage in the current monthly billing cycle can be truncated to match the number of days of usage during the current monthly billing cycle. As indicated by the second entry in Table 4, to compensate for the greater number of days in the current monthly billing cycle, a projected usage is determined at 310 for the previous monthly billing cycle by extrapolating the usage for that billing cycle by one additional day to match the number of days of usage in the current monthly billing cycle.

TABLE 4

Determining Adjustments to Usage Based on Length of Billing Cycle

| Current Cycle | Prev. Cycle | Adjustment |
|---|---|---|
| 01/01-01/31 | 12/01-12/31 | None |
| 12/01-12/31 | 11/01-11/30 | Extrapolate |
| 11/01-11/30 | 10/01-10/31 | None |

At 320, the projected total cost of energy for the previous monthly billing cycle is determined based on the projected usage determined at 310. The determination of the projected total cost of energy is performed as a function of the start date and end date of the previous monthly billing cycle, along with the rates in effect during the previous monthly billing cycle. However, the projected usage determined at 310 is substituted for the actual usage during that previous monthly billing cycle. The adjusted cost of energy for the current monthly billing cycle is determined at 330 based on any changes to the number of days during the current monthly billing cycle. At 340, the difference between the projected total cost of energy determined at 320 and the adjusted cost of energy for the current billing cycle determined at 330 is determined.

Figure 5:
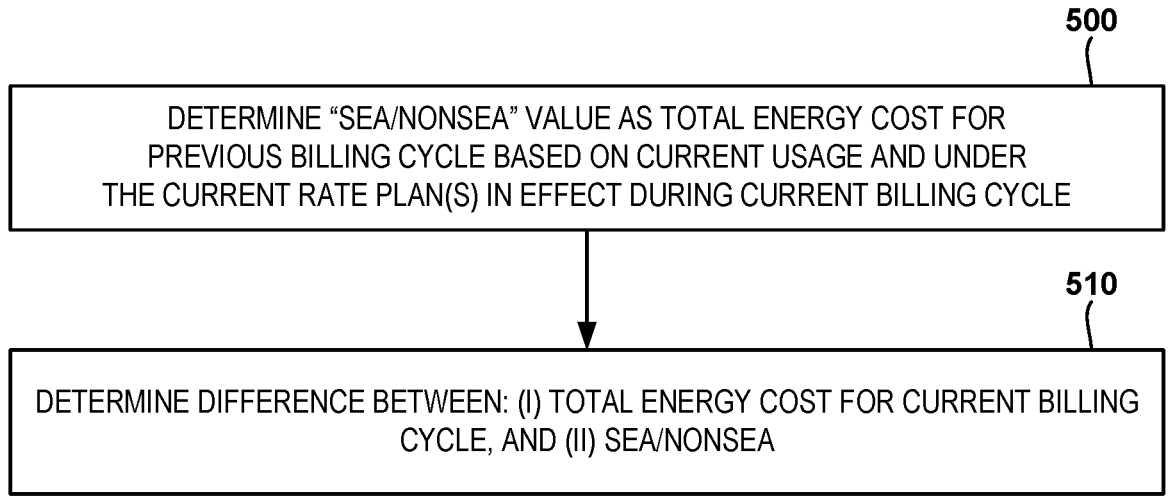
FIG. 5 is a flow diagram for determining the energy cost difference between the current billing cycle and a previous billing cycle attributable to seasonal and/or non-seasonal rate changes only (rate plan the same for each billing cycle)

Using the current and previous billing data 110, 115, optionally modeled to account for any differences in the length of the billing cycles, the portion of a change in total energy cost attributable to seasonal and/or non-seasonal rate changes only (the rate plan is the same for both billing cycles) is determined according to the method of FIG. 5. At 500, the clone 125 is edited to change the start date and the end date of the current monthly billing cycle to the start date and the end date of the previous monthly billing cycle. The current usage and the current rate plan in the clone 125 will remain unchanged from the values included in the current billing data 110. Thus, the term of the current billing cycle is changed, but the rate plan remains unchanged. This hypothetical seasonal/non-seasonal total energy calculation can be determined according to expression [4], below:

$$\text{seasonalAndNonSeasonalRes} = \text{rateEngine.calculate}(\text{cmp.startDate}, \text{cmp.endDate}, \text{cur.usage}, \text{cur.ratePlan}) \quad [4]$$

The portion of the change in total energy cost from the previous monthly billing cycle to the current monthly billing cycle attributable to the seasonal or non-seasonal rate changes is determined, at 510, as the difference between the total energy cost for the current monthly billing cycle and the hypothetical seasonal/non-seasonal total energy calculation expressed by expression [4]. This difference can be represented by expression [5], below:

$$\text{seasonalAndNonSeasonalCost} = \text{cur.totalCost} - \text{seasonalAndNonSeasonalRes.totalCost} \quad [5]$$

Figure 6:
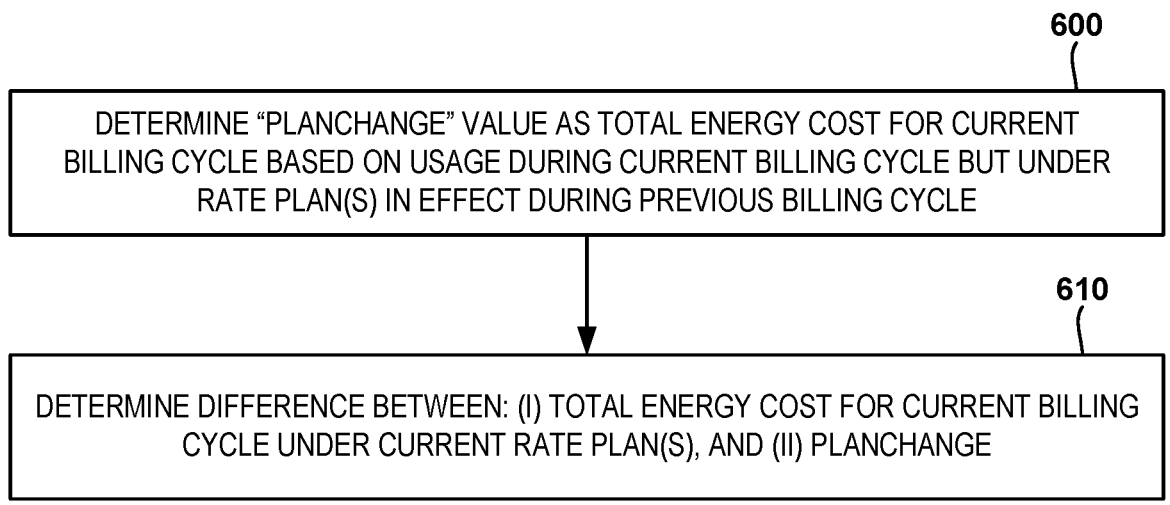
FIG. 6 is a flow diagram for determining the energy cost difference between the current billing cycle and a previous billing cycle attributable to a change in the rate plan only (there were no seasonal and no non-seasonal rate changes between the billing cycles)

Similarly, FIG. 6 is a flow diagram representing a process for determining the energy cost difference between the current billing cycle and a previous billing cycle that is attributable to a change in the rate plan only (no seasonal rate changes and no non-seasonal rate changes between the billing cycles). At 600, the clone 125 is edited to change only the rate plan of the current monthly billing cycle to the rate plan of the previous monthly billing cycle. The start and end dates and the current usage in the clone 125 will remain unchanged from the values of those variables included in the current billing data 110. Thus, the rate plan of the current monthly billing cycle is changed, but the other parameters remain unchanged. This hypothetical plan change total energy calculation can be determined according to expression [6], below:

$$\text{ratePlanChangeRes} = \text{rateEngine.calculate}(\text{cur.startDate}, \text{cur.endDate}, \text{cur.usage}, \text{cmp.ratePlan}) \quad [6]$$

The portion of the change in total energy cost from the previous monthly billing cycle to the current monthly billing cycle attributable to the rate plan change is determined, at 610, as the difference between the total energy cost for the current monthly billing cycle and the hypothetical plan change total energy calculation expressed by expression [6]. This difference can be represented by expression [7], below:

$$\text{ratePlanChangeCost} = \text{cur.totalCost} - \text{ratePlanChangeRes.totalCost} \quad [7]$$

Figure 7:
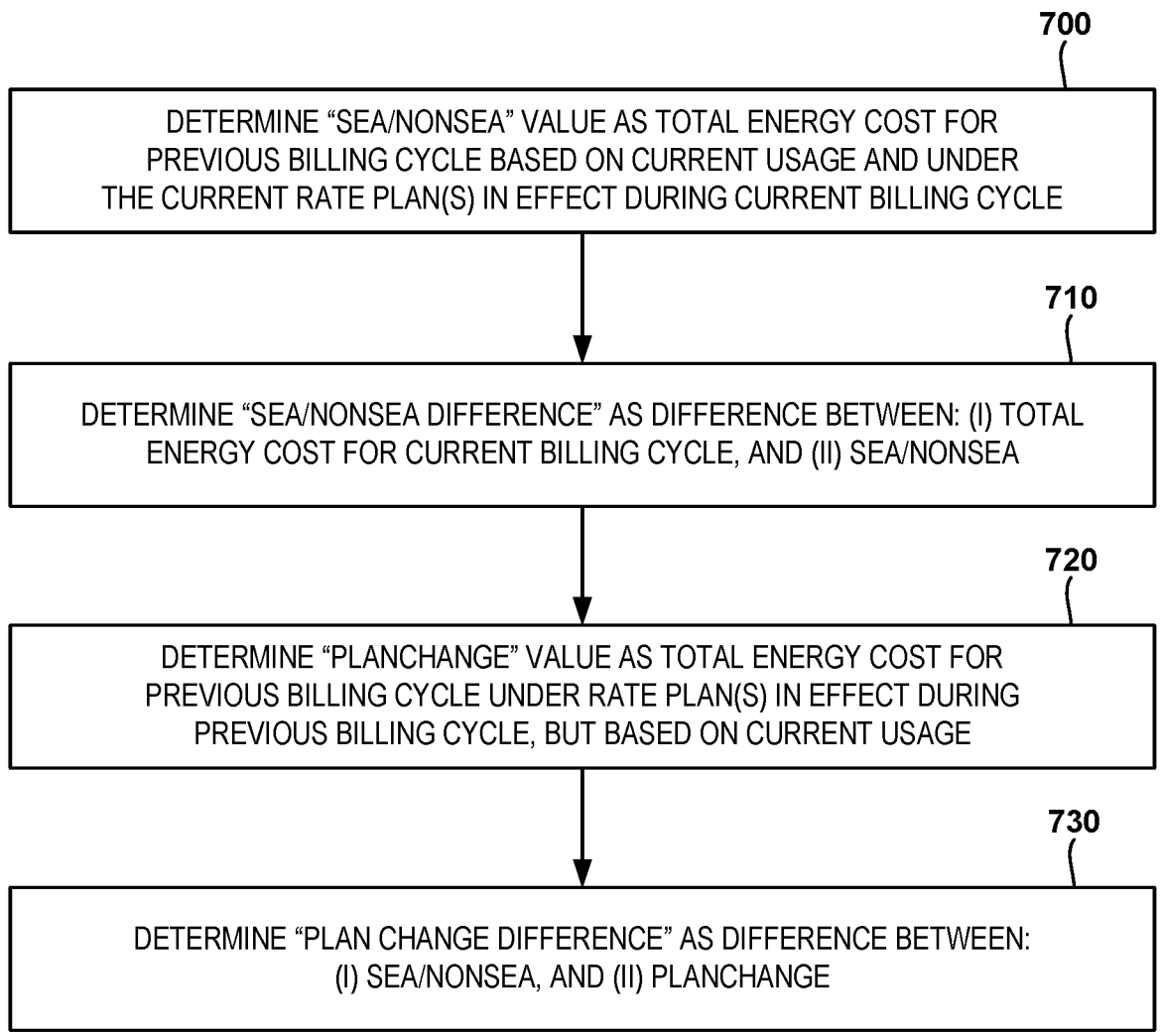
FIG. 7 is a flow diagram for determining the energy cost difference between the current billing cycle and a previous billing cycle attributable to a change in the rate plan and a seasonal or non-seasonal change.

FIG. 7 is a flow diagram summarizing a process for determining the energy cost difference between the current billing cycle and a previous billing cycle attributable to both (ii) a change in the rate plan, and (ii) a seasonal or non-seasonal rate change that have occurred between the current and previous monthly billing cycles. The determination of the hypothetical seasonal/non-seasonal total energy calculation at 700 is the same as the determination of that hypothetical value described above at 500 in FIG. 5. Likewise, the determination of the portion of the change in total energy cost from the previous monthly billing cycle to the current monthly billing cycle attributable to the seasonal or non-seasonal rate changes, at 710, is the same as the determination of that value described above at 510 in FIG. 5. Accordingly, a detailed description of such processes is omitted here. However, embodiments of the present method can be based on the assumption that fewer energy users will make a rate plan change compared to the number of energy users that experience seasonal/non-seasonal rate changes. For such embodiments, the portion of the total energy cost change attributable to seasonal or non-seasonal rate changes is determined before the contribution of any rate plan changes according to the method of FIG. 7.

At 720, the clone 125 used for the determination at 700 is edited to change only the rate plan of the current monthly billing cycle to the rate plan of the previous monthly billing cycle. The start and end dates and the current usage in the clone 125 will be the start and end dates of the previous monthly billing cycle included in the previous billing data 115. These start and end dates were previously edited at step 700, so the rate plan of the current monthly billing cycle is changed to the rate plan(s) in effect during the previous monthly billing cycle. The other parameters remain unchanged. This hypothetical plan change total energy calculation can be determined according to expression [8], below:

$$\text{ratePlanChangeRes} = \text{rateEngine.calculate}(\text{cmp.startDate}, \text{cmp.endDate}, \text{cur.usage}, \text{cmp.ratePlan}) \quad [8]$$

The portion of the change in total energy cost from the previous monthly billing cycle to the current monthly billing cycle attributable to the rate plan change is determined, at 730, as the difference between (i) the total energy cost of the previous monthly billing cycle under the rate plan in effect for the current month, and (ii) the energy cost of the previous monthly billing cycle under the rate plan in effect for the previous month, but for the current usage of the current monthly billing cycle. This difference can be represented by expression [9], below:

$$\text{ratePlanChangeCost} = \text{seasonalAndNonSeasonalRes.totalCost} - \text{ratePlanChangeRes.totalCost} \quad [9]$$

FIG. 9 illustrates an example computing device 900 that is configured and/or programmed with one or more of the illustrative systems and methods described herein, and/or equivalents. The example computing device 900 may be the computer 915 that includes a processor 920, a memory 935, and I/O ports 945 operably connected by a bus 925. In one embodiment, the the computer 915 may include logic of the clone module 105, the comparison module 130, or the flag module 135, configured to facilitate the system 100 and/or the method described with respect to FIGS. 2-7. In different embodiments, the logic of the clone module 105, the comparison module 130, or the flag module 135 may be implemented in hardware, a non-transitory computer-readable medium 905 with stored instructions, firmware, and/or combinations thereof. While the logic of the clone module 105, the comparison module 130, or the flag module 135 is illustrated as a hardware component attached to the bus 925, it is to be appreciated that in other embodiments, the logic of the matching module 105 could be implemented in the processor 920, stored in memory 935, or stored in disk 955.

In one embodiment, logic of the clone module 105, the comparison module 130, the flag module 135, or the computer 715 is a means (e.g., structure: hardware, non-transitory computer-readable medium, firmware) for performing the actions described. In some embodiments, the computing device 900 may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 915 as data 910 that are temporarily stored in memory 935 and then executed by processor 920.

The logic of the clone module 105, the comparison module 130, or the flag module 135 may also provide means (e.g., hardware, non-transitory computer-readable medium 905 that stores executable instructions, firmware) for performing rule based source sequencing for allocation.

Generally describing an example configuration of the computer 915, the processor 920 may be a variety of various processors including dual microprocessor and other multi-processor architectures. The memory 935 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 955 may be operably connected to the computer 915 via, for example, the I/O interface 940 (e.g., card, device) and the I/O ports 945. The disks 955 may be, for example, a magnetic disk drive, a solid state disk drive, a floppy disk drive, a tape drive, a Zip drive, a flash memory card, a memory stick, and so on. Furthermore, the disks 955 may be a CD-ROM drive, a CD-R drive, a CD-RW drive, a DVD ROM, and so on. The memory 935 can store a process, such as within the non-transitory computer-readable medium 905, and/or data 910, for example. The disk 955 and/or the memory 935 can store an operating system that controls and allocates resources of the computer 915.

The computer 915 may interact with input/output (I/O) devices via the I/O interfaces 940 and the I/O ports 945. The I/O devices may be, for example, a keyboard, a microphone, a pointing and selection device, cameras, video cards, displays, the disks 955, the network devices 950, and so on. The I/O ports 945 may include, for example, serial ports, parallel ports, and USB ports. I/O controllers 930 may connect the I/O interfaces 940 to the bus 925.

The computer 915 can operate in a network environment and thus may be connected to the network devices 950 via the I/O interfaces 940, and/or the I/O ports 945. Through the network devices 950, the computer 915 may interact with a network. Through the network, the computer 915 may be logically connected to remote computers (e.g., the computer 915 may reside within a distributed computing environment to which clients may connect). Networks with which the computer 915 may interact include, but are not limited to, a local area network (LAN), a new area network (WAN), and other networks.

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"Energy User", as used herein, includes but is not limited to one or more persons who consume energy from a utility, computers or other devices operated by or on behalf of such persons, or combinations thereof.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that, when executed by at least one processor of a computer system, causes the computer system to:
    receive, by the at least one processor from an invoice database: (i) current billing data usable to determine a total energy cost for energy consumed by an energy user during a current billing cycle, and (ii) previous billing data usable to determine a total energy cost for energy consumed by the energy user during a previous billing cycle;
    create an editable clone data structure that includes a temporary record of the current billing data;
    wherein the editable clone data structure comprises:
        a start date and an end date of a current monthly billing cycle,
        a total electricity usage for the current monthly billing cycle,
        each season included in the current monthly billing cycle, and
        each rate plan in effect during the current monthly billing cycle;
    identify, by the at least one processor, a plurality of variables, each having a value that is different between the current billing data and the previous billing data, the plurality of variables comprising (i) a seasonal rate charged for the energy consumed, (ii) a non-seasonal rate charged for the energy consumed, and (iii) a rate plan defining a charge for the energy consumed;
    transmit, by the at least one processor, the plurality of variables, each having a value that is different between the current billing data and the previous billing data to the editable clone data structure;
    overwrite at least a portion of the current billing data in the editable clone data structure with a hypothetical value of one of the plurality of variables from the previous billing data to modify a value of one of the plurality of variables of the current billing data in the editable clone data structure with the hypothetical value of one of the plurality of variables from the previous billing data to determine a hypothetical energy cost for the current billing cycle based on the hypothetical value of one of the plurality of variables in the previous billing data;

determine a cost difference between the total cost of energy consumed for the current billing cycle and the hypothetical energy cost based upon an individual contribution of the modified value of one of the plurality of variables in the current billing data towards the cost difference;

generate a personalized data structure for the energy user, the personalized data structure including the individual contribution of the modified value;

generate a link that is configured to provide network-accessible access to the personalized data structure over a network communication;

transmit the link to a remote device associated with the energy user;

in response to selection of the link from the remote device, establish network access from the remote device to the personalized data structure and grant access to the personalized data structure, wherein the remote device is enabled to generate an itemized display of the individual contribution from the personalized data structure; and in response to displaying the individual contribution from the personalized data structure, controlling the operation of systems or appliances based on the individual contribution of the modified value from the personalized data structure.

2. The non-transitory computer-readable medium of claim 1, wherein the one of the plurality of variables is independent of a quantity of energy used by the energy user associated with the editable clone data structure; and wherein the personalized data structure is comprised of:
a summary with a graphical representation of the change in total energy cost from a previous monthly billing cycle to the current monthly billing cycle;
an itemized breakdown of individual factors that contribute to the change in total energy cost;
a cost entry which indicates that a seasonal or non-seasonal change in the electric rate occurred during the previous monthly billing cycle, the current monthly billing cycle, or both; and
a rate plan entry which indicates a change in the rate plan selected by the energy user during the previous monthly billing cycle or the current monthly billing cycle.

3. The non-transitory computer-readable medium of claim 1, wherein the computer-executable instructions, when executed by the at least one processor, cause the computer system to:

identify the seasonal rate charged for the energy as the one of the plurality of variables by:
(i) comparing all seasons in effect during the current billing cycle to all seasons in effect during the previous billing cycle, and
(ii) determining that at least one of the seasons in effect during the current billing cycle does not match at least one of the seasons in effect during the previous billing cycle; and in response to identifying the seasonal rate as the one of the plurality of variables, modify the editable clone data structure to attribute at least a portion of the cost difference to a change in the seasonal rate.

4. The non-transitory computer-readable medium of claim 1, wherein the computer-executable instructions, when executed by the at least one processor, cause the computer system to:

identify the non-seasonal rate charged for the energy as the one of the plurality of variables by:
(i) determining that at least one of the seasons in effect during the current billing cycle matches at least one of the seasons in effect during the previous billing cycle, and
(ii) determining that a start date of a current energy rate for the current billing cycle is later than an end date of a previous billing cycle; and in response to identifying the non-seasonal rate as the one of the plurality of variables, modify the editable clone data structure to attribute at least a portion of the cost difference to a change in the non-seasonal rate.

5. The non-transitory computer-readable medium of claim 1, wherein the computer-executable instructions, when executed by the at least one processor, cause the computer system to:

identify the rate plan defining the charge for the energy as the one of the plurality of variables by:
(i) comparing all rate plans in effect during the current billing cycle to all rate plans in effect during the previous billing cycle, and
(ii) determining that at least one of the rate plans in effect during the current billing cycle does not match at least one of the rate plans in effect during the previous billing cycle; and modify the editable clone data structure to attribute at least a portion of the cost difference to a change in the rate plan.

6. The non-transitory computer-readable medium of claim 1, wherein the computer-executable instructions, when executed by the at least one processor, cause the computer system to determine the hypothetical energy cost for the current billing cycle by:

determining that the previous billing cycle has fewer days than the current billing cycle;

extrapolating an energy usage for the previous billing cycle over a number of days in the current monthly billing cycle; and projecting the hypothetical energy cost based on the extrapolated energy usage.

7. The non-transitory computer-readable medium of claim 1, wherein the computer-executable instructions, when executed by the at least one processor, cause the computer system to determine the hypothetical energy cost for the current billing cycle by:

determining that the current billing cycle has fewer days than the previous billing cycle;

truncating an energy usage of the previous billing cycle by excluding from consideration a select number of days in the previous billing cycle that exceed a number of days in the current billing cycle; and projecting the hypothetical energy cost based on the truncated energy usage of the previous billing cycle.

8. A computing system comprising:

at least one processor connected to at least one memory;

an energy comparison module stored on a non-transitory computer readable medium and including instructions that, when executed by the at least one processor, cause the computing system to:

receive, by the at least one processor from an invoice database: (i) current billing data usable to determine a total energy cost for energy consumed by an energy user during a current billing cycle, and (ii) previous billing data usable to determine a total energy cost for energy consumed by the energy user during a previous billing cycle;

create an editable clone data structure that includes a temporary record of the current billing data;

wherein the editable clone data structure comprises:
  a start date and an end date of a current monthly billing cycle,
  a total electricity usage for the current monthly billing cycle,
  each season included in the current monthly billing cycle, and
  each rate plan in effect during the current monthly billing cycle;

identify, by the at least one processor, a plurality of variables, each having a value that is different between the current billing data and the previous billing data, the plurality of variables comprising (i) a seasonal rate charged for the energy consumed, (ii) a non-seasonal rate charged for the energy consumed, and (iii) a rate plan defining a charge for the energy consumed;

transmit, by the at least one processor, the plurality of variables, each having a value that is different between the current billing data and the previous billing data to the editable clone data structure;

overwrite at least a portion of the current billing data in the editable clone data structure with a hypothetical value of one of the plurality of variables from the previous billing data to modify a value of one of the plurality of variables in the current billing data in the editable clone data structure with the hypothetical value of one of the plurality of variables from previous billing data to determine a hypothetical energy cost for the current billing cycle based on the hypothetical value of one of the plurality of variables in the previous billing data;

determine a cost difference between the total cost of energy consumed for the current billing cycle and the hypothetical energy cost based upon an individual contribution of the modified value of one of the plurality of variables in the current billing data towards the cost difference;

generate a personalized data structure for the energy user, the personalized data structure including the individual contribution of the modified value;

generate a link that is configured to provide network-accessible access to the personalized data structure over a network communication; transmit the link to a remote device associated with the energy user;

in response to selection of the link from the remote device, establish network access from the remote device to the personalized data structure and grant access to the personalized data structure, wherein the remote device is enabled to generate an itemized display of the individual contribution from the personalized data structure; and in response to displaying the individual contribution from the personalized data structure, controlling the operation of systems or appliances based on the individual contribution of the modified value from the personalized data structure.

9. The computing system of claim 8, wherein the one of the plurality of variables is independent of a quantity of energy used by the energy user associated with the editable clone data structure; and wherein the personalized data structure is comprised of:
  a summary with a graphical representation of the change in total energy cost from a previous monthly billing cycle to the current monthly billing cycle;
  an itemized breakdown of the individual factors that contribute to the change in total energy cost;
  a cost entry which indicates that a seasonal or non-seasonal change in the electric rate occurred during the previous monthly billing cycle, the current monthly billing cycle, or both; and
  a rate plan entry which indicates a change in the rate plan selected by the energy user during the previous monthly billing cycle or the current monthly billing cycle.

10. The computing system of claim 8, wherein the energy comparison module further includes instructions that, when executed by the at least one processor, cause the computing system to:
  identify the seasonal rate charged for the energy as the one of the plurality of variables by:
    (i) comparing all seasons in effect during the current billing cycle to all seasons in effect during the previous billing cycle, and
    (ii) determining that at least one of the seasons in effect during the current billing cycle does not match at least one of the seasons in effect during the previous billing cycle; and
  in response to identifying the seasonal rate as the one of the plurality of variables, modify the editable clone data structure to attribute at least a portion of the cost difference to a change in the seasonal rate.

11. The computing system of claim 8, wherein the energy comparison module further includes instructions that, when executed by the at least one processor, cause the computing system to:
  identify the non-seasonal rate charged for the energy as the one of the plurality of variables by:
    (i) determining that at least one of the seasons in effect during the current billing cycle matches at least one of the seasons in effect during the previous billing cycle, and
    (ii) determining that a start date of a current energy rate for the current billing cycle is later than an end date of a previous billing cycle; and
  in response to identifying the non-seasonal rate as the one of the plurality of variables, modify the editable clone data structure to attribute at least a portion of the cost difference to a change in the non-seasonal rate.

12. The computing system of claim 8, wherein the energy comparison module further includes instructions that, when executed by the at least one processor, cause the computing system to:
  identify, as the one of the plurality of variables, the rate plan defining the charge for the energy by:
    (i) comparing all rate plans in effect during the current billing cycle to all rate plans in effect during the previous billing cycle, and
    (ii) determining that at least one of the rate plans in effect during the current billing cycle does not match at least one of the rate plans in effect during the previous billing cycle; and
  modify the editable clone data structure to attribute at least a portion of the cost difference to a change in the rate plan.

13. The computing system of claim 8, wherein the energy comparison module further includes instructions that, when executed by the at least one processor, cause the computing system to:

determine that the previous billing cycle has fewer days than the current billing cycle;

extrapolate an energy usage for the previous billing cycle over a number of days in the current monthly billing cycle; and project the hypothetical energy cost based on the extrapolated energy usage.

14. The computing system of claim 8, wherein the energy comparison module further includes instructions that, when executed by the at least one processor, cause the computing system to:

determine that the current billing cycle has fewer days than the previous billing cycle;

truncate an energy usage of the previous billing cycle by excluding from consideration a select number of days in the previous billing cycle that exceed a number of days in the current billing cycle; and project the hypothetical energy cost based on the truncated energy usage of the previous billing cycle.

15. A computer-implemented method involving a computing system comprising at least one processor, the computer-implemented method comprising:

receiving, by the at least one processor from an invoice database: (i) current billing data usable to determine a total energy cost for energy consumed by an energy user during a current billing cycle, and (ii) previous billing data usable to determine a total energy cost for energy consumed by the energy user during a previous billing cycle;

creating an editable clone data structure that includes a temporary record of the current billing data;

wherein the editable clone data structure comprises:
a start date and an end date of a current monthly billing cycle,
a total electricity usage for the current monthly billing cycle,
each season included in the current monthly billing cycle, and
each rate plan in effect during the current monthly billing cycle;

identifying, by the at least one processor, a plurality of variables, each having a value that is different between the current billing data and the previous billing data, the plurality of variables comprising (i) a seasonal rate charged for the energy consumed, (ii) a non-seasonal rate charged for the energy consumed, and (iii) a rate plan defining a charge for the energy consumed;

transmitting, by the at least one processor, the plurality of variables, each having a value that is different between the current billing data and the previous billing data to the editable clone data structure;

overwriting at least a portion of the current billing data in the editable clone data structure with a hypothetical value of one of the plurality of variables from the previous billing data:

wherein the overwriting modifies, by the at least one processor, a value of one of the plurality of variables in the current billing data in the editable clone data structure with the hypothetical value of one of the plurality of variables from the previous billing data to determine a hypothetical energy cost for the current billing cycle based on the hypothetical value of one of the plurality of variables in the previous billing data;

determining, by the at least one processor, a cost difference between the total cost of energy consumed for the current billing cycle and the hypothetical energy cost based upon an individual contribution of the modified value of one of the plurality of variables in the current billing data towards the cost difference;

generating, by the at least one processor, a personalized data structure for the energy user, the personalized data structure including the individual contribution of the modified value;

wherein the personalized data structure is comprised of:
a summary with a graphical representation of the change in total energy cost from a previous monthly billing cycle to the current monthly billing cycle,
an itemized breakdown of the individual factors that contribute to the change in total energy cost,
a cost entry which indicates that a seasonal or non-seasonal change in the electric rate occurred during the previous monthly billing cycle, the current monthly billing cycle, or both, and
a rate plan entry which indicates a change in the rate plan selected by the energy user during the previous monthly billing cycle or the current monthly billing cycle;

generating a link that is configured to provide network-accessible access to the personalized data structure over a network communication;

transmitting the link to a remote device associated with the energy user;

in response to selection of the link from the remote device, establishing network access from the remote device to the personalized data structure and granting access to the personalized data structure, wherein the remote device is enabled to generate an itemized display of the individual contribution from the personalized data structure; and in response to displaying the individual contribution from the personalized data structure, controlling the operation of systems or appliances based on the individual contribution of the modified value from the personalized data structure.

16. The computer-implemented method of claim 15, wherein:

the seasonal rate charged for the energy is identified as the one of the plurality of variables by:
(i) comparing all seasons in effect during the current billing cycle to all seasons in effect during the previous billing cycle, and
(ii) determining that at least one of the seasons in effect during the current billing cycle does not match at least one of the seasons in effect during the previous billing cycle; and in response to the identification of the seasonal rate charged for the energy as the one of the plurality of variables, the editable clone data structure is modified to attribute at least a portion of the cost difference to a change in the seasonal rate.

17. The computer-implemented method of claim 15, wherein the non-seasonal rate charged for the energy is identified as the one of the plurality of variables by:
(i) determining that at least one of the seasons in effect during the current billing cycle matches at least one of the seasons in effect during the previous billing cycle, and
(ii) determining that a start date of a current energy rate for the current billing cycle is later than an end date of a previous billing cycle; and in response to identifying the non-seasonal rate as the one of the plurality of variables, the editable clone data structure is modified to attribute at least a portion of the cost difference to a change in the non-seasonal rate.

18. The computer-implemented method of claim 15, wherein:
the rate plan defining the charge for the energy is identified as the one of the plurality of variables by:
  (i) comparing all rate plans in effect during the current billing cycle to all rate plans in effect during the previous billing cycle, and
  (ii) determining that at least one of the rate plans in effect during the current billing cycle does not match at least one of the rate plans in effect during the previous billing cycle; and
in response to the identification of the rate plan as the one of the plurality of variables, the editable clone data structure is modified to attribute at least a portion of the cost difference to a change in the rate plan.

19. The computer-implemented method of claim 15, wherein determining the hypothetical energy cost for the current billing cycle comprises:
determining that the previous billing cycle has fewer days than the current billing cycle;
extrapolating an energy usage for the previous billing cycle over a number of days in the current monthly billing cycle; and
projecting the hypothetical energy cost based on the extrapolated energy usage.

20. The computer-implemented method of claim 15, wherein determining the hypothetical energy cost for the current billing cycle comprises:
determining that the current billing cycle has fewer days than the previous billing cycle;
truncating an energy usage of the previous billing cycle by excluding from consideration a select number of days in the previous billing cycle that exceed a number of days in the current billing cycle; and
projecting the hypothetical energy cost based on the truncated energy usage of the previous billing cycle.

* * * * *